(12) United States Patent
Fabian et al.

(10) Patent No.: US 8,022,112 B2
(45) Date of Patent: Sep. 20, 2011

(54) PLASTICIZED MIXTURE AND METHOD FOR STIFFENING

(75) Inventors: Michelle Dawn Fabian, Horseheads, NY (US); Edward John Fewkes, Horseheads, NY (US); Kevin Robert McCarthy, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 692 days.

(21) Appl. No.: 11/998,349

(22) Filed: Nov. 29, 2007

(65) Prior Publication Data

US 2008/0125509 A1    May 29, 2008

Related U.S. Application Data

(60) Provisional application No. 60/861,585, filed on Nov. 29, 2006.

(51) Int. Cl.
  *C08F 2/50* (2006.01)
  *B29C 35/08* (2006.01)
  *H05B 6/00* (2006.01)

(52) U.S. Cl. ........... 522/85; 522/84; 522/81; 522/83; 522/113; 522/114; 522/120; 522/121; 522/178; 522/182; 522/150; 522/153; 264/430; 264/433; 264/466; 264/464; 264/470; 264/477; 264/478; 264/488; 264/494; 264/496

(58) Field of Classification Search ........... 522/84, 522/81, 83, 85, 113, 114, 120, 121, 178, 522/182, 150, 153; 264/466, 464, 494, 495, 264/496, 430, 433, 470, 477, 478, 488
See application file for complete search history.

(56) References Cited

U.S. PATENT DOCUMENTS

| | | | |
|---|---|---|---|
| 4,551,295 A | | 11/1985 | Gardner et al. ........... 264/177 R |
| 5,223,188 A | | 6/1993 | Brundage et al. ............ 264/26 |
| 5,458,834 A | * | 10/1995 | Faber et al. ............... 264/109 |
| 5,496,682 A | * | 3/1996 | Quadir et al. ............... 430/269 |
| 5,830,548 A | | 11/1998 | Andersen et al. ........... 428/36.4 |
| 5,916,509 A | * | 6/1999 | Durhman ................... 264/477 |
| 6,117,612 A | * | 9/2000 | Halloran et al. ............ 430/269 |
| 6,197,843 B1 | * | 3/2001 | Rose et al. ................. 522/83 |
| 6,352,763 B1 | | 3/2002 | Dillon et al. ............... 428/325 |
| 6,713,584 B1 | * | 3/2004 | Chisholm et al. .......... 526/329.7 |
| 6,913,824 B2 | * | 7/2005 | Culler et al. ................ 428/401 |
| 7,208,108 B2 | | 4/2007 | Otsuka et al. ................ 264/44 |
| 2005/0093209 A1 | * | 5/2005 | Bergman et al. ............. 264/474 |

FOREIGN PATENT DOCUMENTS

| | | | |
|---|---|---|---|
| EP | 650944 A1 | * | 5/1995 |
| EP | 1012126 B1 | * | 10/2003 |
| JP | 2-290903 | | 11/1990 |
| JP | 4-099203 | | 3/1992 |
| WO | 97/47272 | | 9/1997 |
| WO | 99/46310 | | 9/1999 |

OTHER PUBLICATIONS

Technical Data Sheet for Ciba DAROCUR 4265. (Apr. 9, 2001) [Online]. Retrived online Jun. 15, 2010. Retrieved from internet <URL:http://www.ciba.com/pf/docMDMS.asp?tradename=DAROCUR%204265&docnumber=1146&app_id=ACROBAT&targetlibrary=CHBS_CE_MADS&dt=TDS&ind=20>.*

Ciba Specialty Chemicals: Photoinitiators for UV Curing, Key Products Selection Guide. (Oct. 2003) [online]. retrieved on Jun. 15, 2010. Retrieved from internet <URL:http://cibasc.com/pi.pdf>.*

* cited by examiner

*Primary Examiner* — Sanza McClendon
(74) *Attorney, Agent, or Firm* — Joseph M. Homa

(57) ABSTRACT

A plasticized ceramic-forming mixture and a method for stiffening the mixture, the mixture comprising a combination of inorganic powder, one or more plasticizing organic binders, a radiation-curable monomer, a photoinitiator, and water, and the method comprising stiffening the surfaces of extruded shapes of the mixture by applying electromagnetic energy to the surfaces following extrusion.

10 Claims, 2 Drawing Sheets

PLASTICIZED MIXTURE AND METHOD FOR STIFFENING

RELATED APPLICATIONS

This application claims the benefit of U.S. Provisional Application No. 60/861,585, filed Nov. 29, 2006, entitled "Plasticized Mixture and Method for Stiffening."

BACKGROUND

This invention is in the field of ceramic powder extrusion, and relates to a plasticized powder mixture and a method for stiffening the mixture. In particular, this invention relates to a ceramic-forming powder mixture and a method for stiffening the mixture by applying electromagnetic radiation to the extruded material.

A long-standing problem with forming of plastically deformable materials which use liquids as part of the plasticizing system has been the delicate balance which is necessary to maintaining material which is plastic enough to form with relative ease, and creating a body which is self-supporting and is able to be handled upon formation. This is a particular problem with pseudoplastic or thixotropic materials which use a liquid as part of the plasticizer since such a material tends to exhibit lowered viscosity immediately after forming as a result of the effects of "shear-thinning" inherent in any forming operation involving the application of shear stress on the material.

Generally, as the viscosity of the plastically deformable material is lowered, the wet, formed structure or article tends to collapse since it is not completely self-supporting. Conversely as the viscosity of the plastically deformable material is increased to create a self-supporting final extruded body, forming of the material tends to require significantly higher forming pressures which in turn means that it becomes necessary to use heavier equipment, more substantial forming members, and abrasion resistant parts.

With current technology, there is extreme difficulty in forming a thin-walled self-supporting body from a plastically deformable material which can be firmly handled without deforming the body, particularly when liquid is used as part of the material plasticizing system. The solution to this problem generally has been either to form only relatively thick-walled bodies, or to create bodies from materials that can be stiffened by rapid cooling or heating. After a self-supporting body has been formed from a plastically deformable material using liquid as part of a plasticizing system, it has been necessary to dry it to remove the liquid prior to sintering particulate material or to harden the formed material to enable machine handling.

U.S. Pat. No. 5,223,188 discloses a method of stiffening plastically deformable material that has been newly formed into a shaped body. The method includes exposing the material, which includes body-forming matter, polar molecules, and a polymeric agent having a thermal gel point, to electromagnetic radiation within the frequency range 107 to 1013 Hertz. The radiation is applied to effect thermal gelling as the shaped body emerges from an extrusion die.

U.S. Patent Publication No. 2005/0093209 discloses an apparatus and method for stiffening a wet extruded ceramic body for improved handling prior to drying and firing. The ceramic body, for example an extruded honeycomb shape, is formed from a plastically deformable material including inorganic raw materials, and organics, such as a binder having a thermal gel point. As the ceramic body exits the extrusion die it is passed through a microwave energy field to be heated to above the gelling point of the organic binder. The ceramic body then stiffens and can be easily handled without deformation.

Notwithstanding the foregoing, numerous problems remain relating to the forming of wet extruded ceramic bodies in a way that can accurately retain a formed shape through handling and until drying. Accordingly, efforts continue toward the development of improved methods by which shape retention in wet extruded ceramic bodies could be more effectively achieved, and most preferably achieved using simplified processes and equipment more compatible with existing manufacturing methods.

SUMMARY

The present invention provides an improved process through which the skin of wet extruded plastically deformable ceramic material can be toughened instantly and in a manner that is fully compatible with current manufacturing practices. In general, these results are achieved through the use of an efficient electromagnetic cross-linking step that rapidly crosslinks constituents present in the ceramic material in a manner effective to quickly stiffen the surface of the extruded material, minimizing or preventing deformation of the extruded shape.

In a first aspect, therefore, the invention includes a method for making a stable extruded shape of ceramic material first forming a plasticized ceramic powder mixture. That mixture will comprise, in addition to one or more inorganic powders, organic binders, and water, at least one radiation-curable monomer and at least one photoinitiator. The inorganic powder(s) are generally ceramic-forming powders, i.e., ceramic materials or materials that can be converted to ceramic materials upon firing.

The plasticized ceramic powder mixture is then extruded or otherwise formed into a selected shape, as for example an extruded honeycomb shape. The shape thus formed is then treated by the application of electromagnetic energy to the surface thereof, that energy being effective to initiate curing, and typically cross-linking, of the radiation-curable monomer.

In another aspect, the invention includes a method for making a ceramic article. In accordance with that method a wet plasticized ceramic powder mixture comprising ceramic-forming powder, plasticizing organic binder, radiation-curable monomer, photoinitiator and water is extruded to provide an extruded preform, and electromagnetic energy is applied to the surface of the extruded preform to stiffen the surface thereof. Thereafter the thus-treated preform is heated to dry the powder mixture and sinter the powder to produce the ceramic article.

In yet another aspect, the invention provides a plasticized ceramic powder mixture for forming a ceramic article. That mixture comprises at least one inorganic powder, at least one organic binder, at least one radiation-curable monomer, at least one photoinitiator, and water. The inorganic powder will comprise powders of ceramics, or of precursors that can be converted to ceramic via sintering or reaction-sintering during the firing of the powder mixture.

DESCRIPTION OF THE DRAWINGS

The invention is further described below with reference to the appended drawings, wherein FIG. 1 plots applied stress versus displacement for a conventional wet plasticized ceramic mixture, and FIG. 2 plot applied stress versus displacement for a wet plasticized ceramic mixture treated in accordance with the invention.

DETAILED DESCRIPTION

Figure 1:
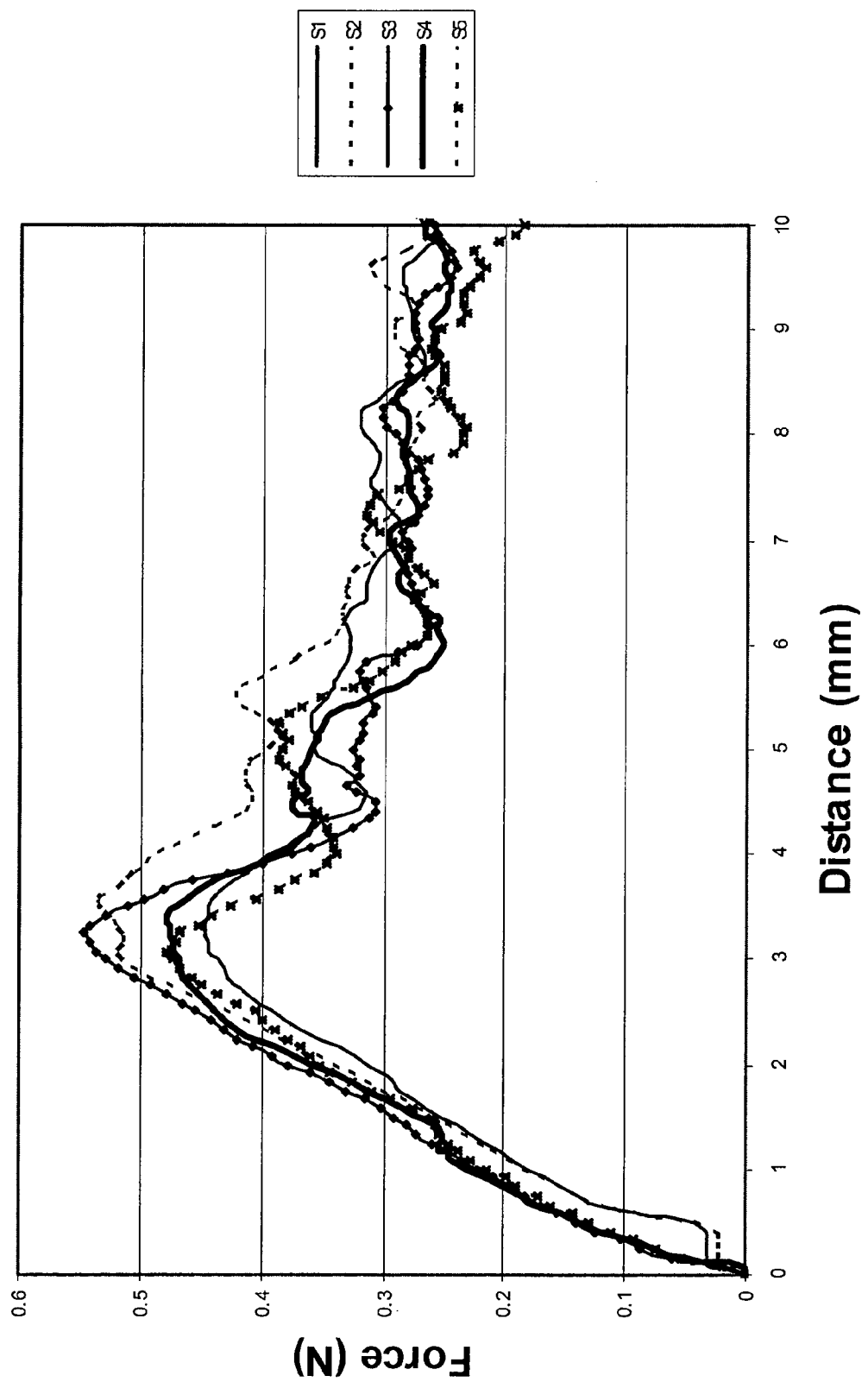

Wet plasticized ceramic mixtures suitable for use in the practice of the invention will comprise inorganic powders, one or more plasticizing organic binders, a radiation-curable monomer, a photoinitiator, and water. The inorganic powders, plasticizing organic binders, and water are present in proportions such that the ceramic mixture as prepared will have a plastic consistency suitable for extrusion into a complex shape such as a honeycomb. The inorganic powders will consist of ceramic materials or precursors for ceramic materials that can be sintered or reaction-sintered to form bonded ceramic structures during the firing of the shape after drying of the shape to remove water therefrom.

In most cases, the complex shape will be integrally extruded with a continuous surface layer or skin. The plasticized ceramic mixtures of the invention are particularly beneficial in providing extruded shapes that can be efficiently treated via radiation to provide not only high stiffness and high wet strength, but also lower susceptibility to skin defects. In particular, method of the invention provides extruded ceramic shapes having skins with reduced air cracks, fissures, grooving, and other defects. As a particular benefit of these reduced skin defects, the products produced by drying and firing the wet extruded shapes will exhibit increased strength.

The invention is particularly advantageous in that the electromagnetically treated plasticized mixture is stiffened essentially instantaneously. Thus, no decrease in line speed is needed to insure that the polymerization has taken place.

Good plasticity and forming characteristics are typically observed in ceramic powder batch mixtures comprising 70-85% inorganic powders, 15-25% water, and 1-5% of plasticizing organic binders by weight. For best extrusion behavior, the batches may additionally comprise optional solid lubricants, oils, surfactants, and the like, typically in proportions of 0.5-2% by weight, although the use of larger quantities, e.g., up to as much as 10% by weight, of non-solvent oils is also conventional.

Exemplary inorganic powders useful as major or minor constituents of these extrudable mixtures include one or more powders selected from the group consisting of clay, talc, alumina, silica, titania, alkali and alkaline earth oxides, cordierite, aluminum titanate, mullite, silicon carbide, silicon nitride, $ZrO_2$, $ZnO$, $B_2O_3$, $La_2O_3$, and $P_2O_5$. Preferably, the plasticized mixture will include at least one inorganic powder selected from the group consisting of talc, aluminosilicate clay, alumina, silica, and titania.

The most common plasticizing organic binders incorporated in these ceramic powder are water soluble or water-dispersible cellulose derivatives. Examples of such binders include cellulose ethers, such as those described in Chapter 11 of *Introduction to the Principles of Ceramic Processing*, J. Reed, John Wiley and Sons, NY, N.Y., 1988. Specific examples include methylcellulose, hydroxypropyl methylcellulose, and ethylcellulose, these being commercially available from The Dow Chemical Company under the METHOCEL® and ETHOCEL® trade names.

To achieve good cross-linking and stiffening of the surface of wet extruded ceramic materials, the above-described plasticized mixtures will additionally include at least one radiation-curable monomer. For the purpose of the present description a radiation-curable monomer is a compound that contains one or more ethylenically unsaturated groups that will polymerize when exposed to activating light or electron beam energy. The activating light may be visible light but is more typically UV light of a frequency conventionally employed to polymerize radiation-curable monomers in synthetic resin-based liquids.

Specific examples of suitable radiation-curable monomers include but are not limited to acrylates, methacrylates, acrylamides, N-vinyl amides, styrenes, vinyl ethers, vinyl esters, and epoxies. Particularly effective in wet ceramic mixtures are the acrylate functional monomers, specifically water-soluble acrylate functional monomers containing two or more (meth)acrylate functional groups. Monomers comprising epoxy, vinyl ether or thiolene groups are also quite effective.

These radiation-curable monomers will be added to the plasticized ceramic mixtures in proportions at least effective to achieve rapid stiffening of the skins or surfaces of wet plasticized ceramic shapes. The amounts useful for that purpose will vary depending upon the particular compositions of the ceramic mixtures and selected monomer(s), but may readily be determined by routine experiment. For water-soluble acrylate-functional monomers and monomers of equivalent sensitivity to UV radiation, monomer concentrations in the range of 2-8% by weight of the plasticized mixture will usually be effective.

The plasticized mixture will additionally include at least one photoinitiator effective to initiate polymerization and cross-linking of the radiation curable monomer(s). For purposes of the present description a photoinitiator is a composition that is capable of adsorbing light and forming reactive species that initiate polymerization of a radiation-curable monomer. Examples of photoinitiators useful for that purpose in the above described radiation-curable monomers may consist of one or more compounds selected from the following group:

hydroxycyclohexylphenylketone;
hydroxymethylphenylpropanone;
dimethoxyphenylactophenone;
2-methyl-1-[4-(methyl thio)-phenyl]-2-morpholinopropanone-1;
1-(4-isopropylphenyl)-2-hydroxy-2-methylpropan-1-one;
1-(4-dodecyl-phenyl)-2-hydroxy-2-methylpropan-1-one;
4-(2-hydroxyethoxy)phenyl-2(2-hydroxy-2-propyl)ketone;
diethoxyphenyl acetophenone;
2-hydroxy-2-methyl-1-phenyl-propan-1-one;
2,4,6-trimethylbenzoyl diphenylphosphine oxide;
ethyl-2,4,6-trimethylbenzoyl phenylphosphinate;
(2,6-dimethoxy benzoyl)-2,4,4 trimethylpentylphosphine oxide;
bis(2,6-dimethoxybenzoyl)2,4,4'-trimethylpentyl)phosphine oxide;
2-hydroxy-2-methyl-1-phenyl-propan-1-one;
(2-benzyl-2-N,N-dimethylamino-1-(4-morpholinophenyl)-1-butanone);
benzophenone;
bis(2,4-cyclopentadien-1-yl)-bis[2,6-difluoro-3-(1H-pyrrol-1-yl)phenyl]titanium;
2,4 phosphine oxide;
triaryl sulfonium hexafluoroantimonate salts;
triaryl sulfonium hexafluorophosphate salts; and
diaryliodonium hexafluoroantimonate.

Photoinitiators for achieving the best levels of surface cure and depth of cure of the above-described monomers, therefore offering the most rapid and effective stiffening of the surfaces or skins of wet plasticized ceramic mixtures, will be selected from the group consisting of ketonic and phosphine-oxide based initiators. A particular example of such a photoinitiator is a 50:50 blend of bis(2,6-dimethoxybenzoyl)2,4,4-trimethyl-phosphine oxide and 1-hydroxycyclohexyl phenyl ketone, that blend being commercially available as Irgacure® 1850 photoinitiator from Ciba Specialty Chemicals, Basel, Switzerland.

The above-described individual components of the mixture can be added in any order and mixed. Conventionally, however, the dry components including the inorganic powders and the solid organic components are first dry blended in a Littleford mixer until fully blended, and the wet ingredients including the water are then added to the dry mixture and wet-mixed. The wet powder batch is then fed into an extruder such as a twin screw extruder wherein it is plasticized and then extruded through a forming die to form a wet plasticized ceramic shape. U.S. Pat. No. 4,551,295(A) is illustrative of this process.

Light irradiation, and in particular UV light irradiation, is the treatment most effective to initiate monomer polymerization, cross-linking and skin stiffening in wet plasticized ceramic materials incorporating the exemplary monomers and photoinitiators listed above. For best results, the selected radiation will be applied to the wet plasticized mixture just as it issues from the extrusion die.

In an important embodiment of the invention, the wet plasticized material to be stabilized is extruded in the configuration of a honeycomb shape, i.e., a structure of complex cross-section defined by intersecting walls surrounding open, elongated cells channels extending longitudinally through the formed body in the direction of extrusion. Dried and fired honeycombs thus produced are in wide commercial use as catalysts, catalyst supports and wall flow filters for the treatment of exhaust emissions from combustion processes, e.g., from the operation of motor vehicle engines. For those applications the honeycomb shapes will generally be extruded with integral skin layers that are subject to defect development as above described, but that can be very effectively stiffened and thus protected from shape distortion and cracking through the addition of the disclosed monomers and photoinitiators to the ceramic mixture, and the prompt irradiation thereof following extrusion. Extruded shapes incorporating stiffened surface layers as described can be subjected to handling as required for subsequent drying and firing with much less susceptibility to handling damage.

The invention is further described below with reference to certain specific embodiments thereof, which embodiments are intended to be illustrative rather than limiting.

EXAMPLES

Two representative wet plasticized ceramic powder mixtures suitable for the production of ceramic honeycomb shapes via honeycomb extrusion are prepared for evaluation. The mixtures are principally clay-talc-alumina batches adapted for the production of cordierite honeycombs through the reaction-sintering of the clay, talc and alumina powders present in the honeycomb preforms after shaping and drying.

Table 1 below sets forth the proportions of ingredients present in the batches, exclusive of water. The proportions of the inorganic powder ingredients in Table 1 are reported in weight percent of the total inorganic powder mixture for each of the formulations. The proportions of additional ingredients are reported in parts by weight added for each hundred parts (weight) of the combined inorganic powder ingredients, thus constituting parts by weight in excess of the powders.

TABLE 1

Ceramic Powder Mixtures

| Material | Formulation A | Formulation B |
|---|---|---|
| Calcined kaolin clay | 19.3% | 19.3% |
| Talc | 40.4% | 40.4% |
| Delaminated kaolin clay | 15.3% | 15.3% |
| Powdered silica | 6.3% | 6.3% |
| Coarse alumina | 14.1% | 14.1% |
| Fine alumina | 4.7% | 4.7% |
| Total (inorganic powders) | 100% | 100% |
| Additional constituents (wt. parts/hundred over base) | | |
| Stearic acid | 0.6 pph | 0.6 pph |
| methylcellulose | 2.9 pph | 2.9 pph |
| Polyalpha olefin oil | — | 6 pph |
| Diacrylate monomer | 6 pph | — |
| Phosphine oxide-ketone photoinitiator | 0.18 pph | — |

The inorganic powder components are first dry-mixed until blended, and the organic binder system consisting of a mixture of the methylcellulose and stearic acid is then added to the pre-mixed inorganic powders with further blending until thoroughly dispersed. The water vehicle is then added with mixing to the resulting dry mixture, the latter being added to both batches in a proportion sufficient to constitute 23.5% by weight of each of the final wet powder mixtures. Finally the cross-linking monomer system, consisting of a pre-blended mixture of the diacrylate monomer and phosphine photoinitiator, is added to and dispersed throughout the wet ceramic-forming mixture. For these examples the monomer consists of SR344™ PEG$_{400}$ DA monomer and the photoinitiator consists of Irgacure® 1850 photoinitiator. The resulting final mixture is then subjected to further paddle mixing for a time sufficient to homogenize and plasticize the batch.

The plasticized batches thus provided are next de-aired, compacted, and extruded into ribbon and honeycomb shapes for evaluation. Ribbon samples 4 mm in thickness and 26 mm in width are subjected to uv cross-linking under a 600 watt ultraviolet D-bulb at 50% power. The irradiated samples are then compared with samples of the same dimensions that are not subjected to uv cross-linking, through the tensile testing of dogbone samples cut from the ribbons to determine differences in elastic modulus. Tensile testing is carried out at a sample extension rate of 2.54 cm/min., with typical Young's Modulus values for irradiated and non-irradiated samples being as reported in Table 2 below.

TABLE 2

Tensile Test Results

| Sample ID | % Water | Young's Modulus (MPa) No UV Exposure | Young's Modulus (MPa) UV Cured |
|---|---|---|---|
| Formulation A | 23.5 | 203 +/− 17 | 365 +/− 13 |
| Formulation B | 23.5 | 210 +/− 10 | 205 +/− 27 |

As can be seen from the data set forth in Table 2, the addition of the UV curable monomer to the batch results in a significant increase in the Young's modulus of the extruded ribbon after exposure to UV light. This demonstrates that radiation curing can be used to stiffen the extruded batch. The lack of an increase in the Young's modulus when Formulation B is exposed to UV light demonstrates that the increase in stiffness in Formulation A is due to photopolymerization and not to other effects such as loss of water or gelling of the methylcellulose binder.

The honeycomb samples subjected to skin cross-linking tests to determine effects on honeycomb skin stiffness are cylindrical extruded honeycomb samples of 2.5 cm diameter extruded from plasticized powder batches having the composition of Formulation A of Table 1. The honeycombs have cell densities of 600 cells/in$^2$ of cross-section and cell wall thicknesses of 150 um.

Half of the extruded honeycomb samples are subjected to uv exposures utilizing the same uv source as used to cross-link the ribbon samples described above, with skin sections of each of the samples being exposed to the activating light for 15 seconds. The remaining honeycombs are not subjected to uv cross-linking.

Figure 2:
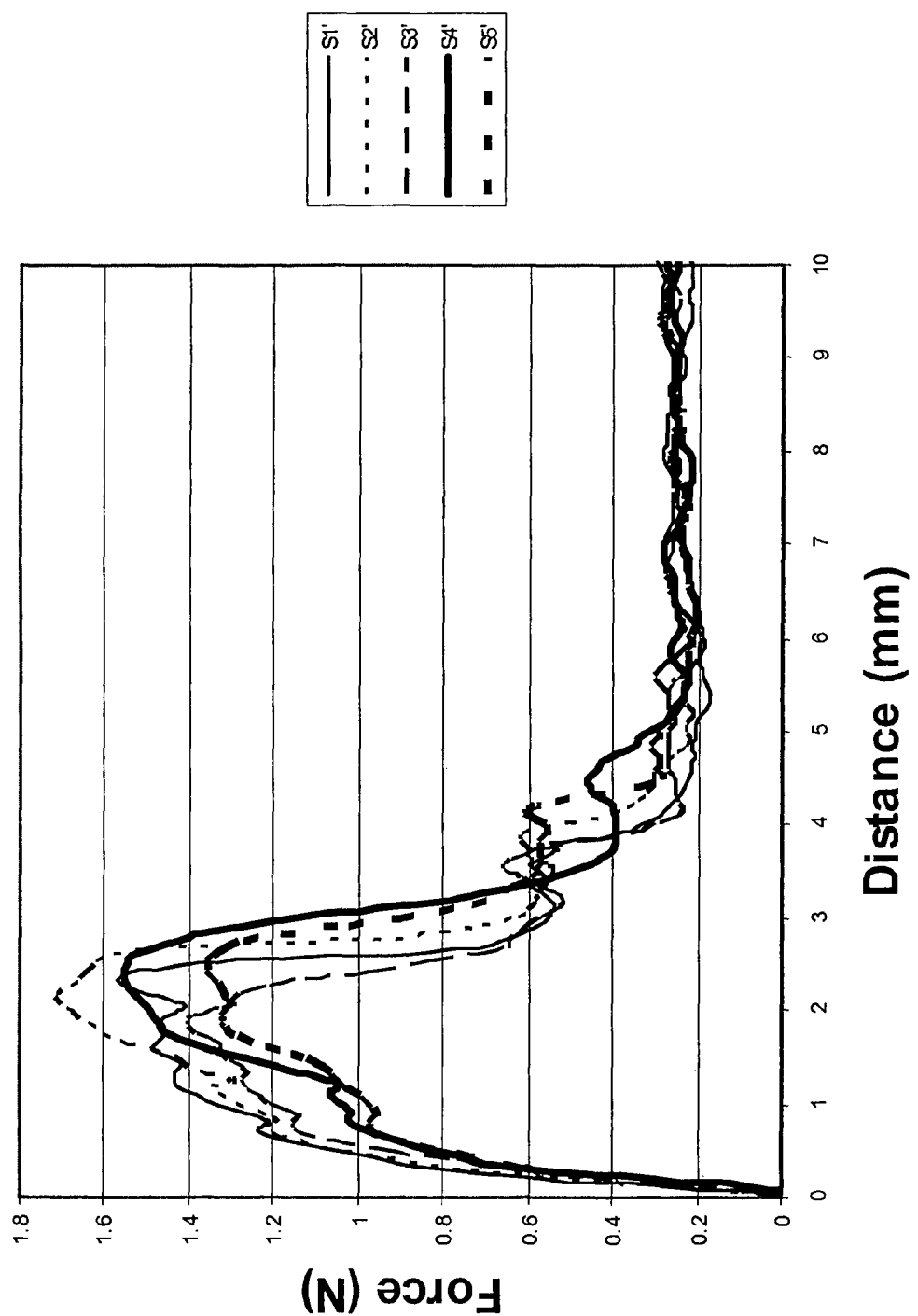

FIGS. 1 and 2 of the drawings set forth skin yield stress results for ball indentation tests conducted on various cross-linked and non-cross-linked honeycombs. The tests utilize a ball indentor to measure skin yield stress as a function of ball displacement during the skin indentation. FIG. 1 reports indentation data for the non-irradiated samples S1-S5, while FIG. 2 records data for the irradiated samples S1'-S2', all samples being evaluated under identical skin indentation test conditions. As can be seen from the load vs. displacement curves for the two types of samples, the effect of UV curing of the honeycomb skins results in approximately a 3× increase in the peak deflection loads sustainable by the cross-linked skins over the non-cross-linked skins at the displacements of maximum load in the two cases. Thus the much higher resistance of the cross-linked samples to skin deformation is evident.

Of course, the foregoing examples are merely illustrative of the invention as it may be adapted for the production of ceramic and other inorganic powder products exhibiting improved shape retention within the scope of the appended claims.

We claim:

1. A method for making a stable extruded shape of ceramic material comprising:
   forming a plasticized ceramic powder mixture comprising inorganic powder, organic binder, radiation-curable monomer, photoinitiator and water, wherein the organic binder comprises at least one cellulose derivative;
   extruding the plasticized powder mixture to provide an extruded shape, wherein the extruded shape is a honeycomb shape comprising a surrounding skin; and
   applying electromagnetic energy to the surface of the extruded shape to initiate curing of the monomer.

2. The method of claim 1 wherein the electromagnetic energy is ultraviolet light.

3. The method of claim 2 wherein the electromagnetic energy is applied to the surface of the extruded shape as it is extruded.

4. The method of claim 1 comprising further steps of drying and firing the honeycomb shape to provide a ceramic honeycomb.

5. A plasticized ceramic powder mixture for forming a ceramic article comprising:
   at least one inorganic powder;
   at least one organic binder, wherein the at least one organic binder comprises a cellulose derivative;
   at least one radiation-curable monomer;
   at least one photoinitiator; and
   water.

6. The mixture of claim 5 wherein at least one inorganic powder is selected from the group consisting of clay, talc, alumina, silica, titania, alkali and alkaline earth oxides, cordierite, aluminum titanate, mullite, silicon carbide, silicon nitride, $ZrO_2$, $ZnO$, $B_2O_3$, $La_2O_3$, and $P_2O_5$.

7. The mixture of claim 5 wherein at least one radiation-curable monomer contains one or more ethylenically unsaturated groups.

8. The mixture of claim 5 wherein at least one photoinitiator is selected from the group consisting of:
   hydroxycyclohexylphenylketone;
   hydroxymethylphenylpropanone;
   dimethoxyphenylactophenone;
   2-methyl-1-[4-(methyl thio)-phenyl]-2-morpholinopropanone-1;
   1-(4-isopropylphenyl)-2-hydroxy-2-methylpropan-1-one;
   1-(4-dodecyl-phenyl)-2-hydroxy-2-methylpropan-1-one;
   4-(2-hydroxyethoxy)phenyl-2(2-hydroxy-2-propyl)ketone;
   diethoxyphenyl acetophenone;
   2-hydroxy-2-methyl-1-phenyl-propan-1-one;
   2,4,6-trimethylbenzoyl diphenylphosphine oxide;
   ethyl-2,4,6-trimethylbenzoyl phenylphosphinate;
   (2,6-dimethoxy benzoyl)-2,4,4 trimethylpentylphosphine oxide;
   bis(2,6-dimethoxybenzoyl)2,4,4'-trimethylpentyl) phosphine oxide;
   2-hydroxy-2-methyl-1-phenyl-propan-1-one;
   (2-benzyl-2-N,N-dimethylamino-1-(4-morpholinophenyl)-1-butanone);
   benzophenone;
   2,4 phosphine oxide;
   triaryl sulfonium hexafluoroantimonate salts);
   triaryl sulfonium hexafluorophosphate salts
   diaryliodonium hexafluorantimonate; and
   bis(2,4-cyclopentadien-1-yl)-bis[2,6-difluoro-3-(1H-pyrrol-1-yl)phenyl]titanium.

9. The mixture of claim 5 wherein at least one photoinitiator is selected from the groups consisting of ketonic and phosphine-oxide based initiators.

10. The mixture of claim 5 wherein at least one photoinitiator is Bis(2,6-dimethoxybenzoyl)2,4,4-trimethyl-phosphine oxide or 1-Hydroxycyclohexyl phenyl ketone.

* * * * *